United States Patent [19]
Stoeck et al.

[11] 3,725,465
[45] Apr. 3, 1973

[54] PREPARATION OF L-3,4-DIHYDROXY-PHENYL-ALANINE

[75] Inventors: Georg Stoeck; Heinz-Günter Budka, both of Mannheim-Waldhof; Fritz Topfmeier, Heidelberg; Wolf-Dietrich Gradel, Mannheim, all of Germany

[73] Assignee: Boehringer Mannheim GmbH, Mannheim, Germany

[22] Filed: Aug. 3, 1971

[21] Appl. No.: 168,737

[30] Foreign Application Priority Data

Aug. 7, 1970 Germany.....................P 20 39 253.4

[52] U.S. Cl..............................260/501.11, 260/519
[51] Int. Cl..............................................C07c 101/08
[58] Field of Search...................................260/501.11

[56] References Cited

UNITED STATES PATENTS 3,590,077  6/1971  Muller et al.....................260/501.17

OTHER PUBLICATIONS

Chemical Abstracts, Vol. 49 column 11750(d) (1955)

Primary Examiner—Leon Zitver
Assistant Examiner—Gerald A. Schwartz
Attorney—Ralph D. Dinklage et al.

[57] ABSTRACT

To an aqueous solution of D,L-N-benzoyl-3,4-dimethoxy-phenyl-alanine there is added at least one amine selected from the group consisting of D(-)-threo-1-m-nitrophenyl-2-amino-propanediol-1,3, D(-)-threo-1-p-nitrophenyl-2-amino-propanediol-1,3 and D(-)-threo-1-phenyl-2-amino-propanediol-1,3 selectively to precipitate the amine salt of the L-stereoisomer which is separated, dissolved and acidified to precipitate the free L-stereoisomer which is saponified to L-3,4-dihydroxy-phenyl-alanine. The mother liquor from the initial precipitation containing the amine salt of the D-stereoisomer and some L-stereoisomer is acidified to precipitate the free stereoisomers, leaving the amine in the acidified solution. The precipitated free stereoisomers are racemized and recycled for recovery of additional L-stereoisomer. The acidified solution of amine is rendered alkaline and steps are taken to regenerate and recycle the free amine.

5 Claims, No Drawings

PREPARATION OF L-3,4-DIHYDROXY-PHENYL-ALANINE

The present invention relates to a process for preparing L-DOPA (3,4-dihydroxyphenylalanine) from D,L-N-benzoyl-3,4-dimethoxyphenylalanine.

L-DOPA is a known natural product for which a number of syntheses have been described. The discovery that continued application of this substance can alleviate or cure certain forms of Parkinson's disease has created a need for a simple, economical method of preparation.

Since practically all syntheses proceed via racemic intermediary stages, the separation thereof into the optically active antipodes is a step of the synthesis which is particularly critical and decisive concerning its cost. Therefore, several proposals have recently been made to solve this problem, e.g. Belgian patent 721,591 and the literature cited therein, but they all fall short of the requirements which are that:

1. the starting materials can be produced easily and inexpensively,
2. the separating agents (optically active auxiliary materials) are inexpensive, i.e. they are either cheap or recoverable in very high yields,
3. the cost of the solvents and other chemicals is low, and
4. equipment, labor and energy requirements are small.

It is accordingly an object of the present invention to provide a process meeting all these requirements.

This has now been achieved by the present invention in accordance with which a mixture of D,L-N-benzoyl-3,4-dimethoxy-phenylalanine (hereinafter abbreviated as D,L-BDA) is reacted in aqueous solution with at least one amine selected from the group consisting of D(-)-threo-1-m-nitrophenyl-2-amino-propanediol-1,3 (hereinafter abbreviated as D-NAP), D(-)-threo-1-p-nitrophenyl-2-amino-propanediol-1,3 and D(-)-threo-1-phenyl-2-amino-propanediol-1,3, to form a diastereomeric salt pair which, due to the different solubilities, selectively crystallizes in fractionated form.

The method according to the invention for the preparation of L-DOPA is therefore characterized in that racemic N-benzoyl-3,4-dimethoxyphenylalanine is reacted with one-half to 1 molar equivalent of D(-)-threo-1-m-nitrophenyl-2-amino-propane diol-1,3 or the other indicated amines and optionally with up to about one-half molar equivalent of an alkali such as sodium hydroxide in water of preferably at least 50°C; the total of amine and sodium hydroxide is approximately the molar equivalent of the L,D-stereoisomers in the racemate. The solution is adjusted to approximately neutral or slightly alkaline by addition of a little acid or alkali, it is cooled to approximately 30°C, optionally mixed with some seed crystals of D(-)-threo-1-m-nitrophenylpropane-1,3-diol-2-ammonio-L-N-benzoyl-3,4-dimethoxyphenylalanate, the solution is slowly cooled while stirring constantly, and the precipitate is filtered off. The precipitate is re-dissolved in warm water and decomposed with dilute acid, preferably inorganic, to precipitate free L-N-benzoyl-3,4-dimethoxy-phenylalanine which is separated and converted into L-DOPA by saponification.

Contrary to all methods hitherto known which are carried out in low-boiling organic solvents, the method according to the invention can be carried out in water, practically eliminating the costs for solvent, its recovery and the protective measures necessary in the event the solvent is inflammable.

The D,L-BDA serving as starting product can be produced inexpensively, e.g. from veratrum aldehyde in an amino acid synthesis according to Erlenmeyer.

The amine separating agents are intermediate or by-products of the chloramphenicol synthesis. The preferred amine is D-NAP, described in German Patent 972,977, which is at least as effective as the other amines but which is so comparatively inexpensive that it can even be used without ultimate regeneration and recycling. The other amines, being more expensive, are limited to use in processes where the separating agent is recycled.

The extent to which D,L-BDA and D-NAP dissolve in water is essentially determined by the temperature. Temperatures from 50°C to the boiling point of the water have proven suitable; temperatures around 70°C are preferred as an optimal compromise between time and energy requirements. Impurities can be removed in a simple manner using activated carbon.

The pH-value during the separating operation is not critical in itself, but the solution should at most be only slightly acidic since, otherwise, free D-N-benzoyl-3,4-dimethoxyphenylalanine will also precipitate; neither should the solution be too highly alkaline lest the compounds decompose. Therefore, a pH-value of about 6.5–8.0 is advantageous, and operation at about the neutral point is preferred.

The solubilities of the pure salts in water at 25°C is about 5.4 g/100 ml for D-BDA/D-NAP salt and about 1.6 g/100 ml for L-BDA/D-NAP but, due to a co-solvent effect by the presence of each other and other components, the solubilities are much higher for the mixture to be separated. Since, according to the above, the solubilities of the diastereomeric salts only differ by a factor of 3.4 times, impure products are obtained if the solutions are too concentrated. On the other hand, the solubility of the desired L-BDA/D-NAP salt cannot be ignored so that if the solutions are too dilute the yield drops markedly. Experimentally, solvent (i.e., water) to solids (ml/g) ratios of 2 to 20:1 have shown to be a suitable compromise, higher solvent ratios being permitted as the amount of D-NAP is increased and the quantity of sodium hydroxide added to adjust the pH is reduced. Solvent to solids ratios of 3 to 10:1 are preferred, since they permit practically pure L-BDA/D-NAP to be obtained in satisfactory yields.

The example that follows illustrates the process of the invention in greater detail.

EXAMPLE

A. Racemate Separation of D,L-N-benzoyl-3,4-dimethoxyphenyl alanine (D,L-BDA) with D(-)-threo-1-m-nitrophenyl-2-aminopropanediol-1,3 (D-NAP)

a. 200 g of D,L-BDA (0.608 mole), 77.3 g of D-NAP (0.365 mole) and 9.7 g of caustic soda (0.243 mole) are dissolved in 780 ml of water at 70°C. The pH-value is 5.8. The solution is cooled to 50°C, adjusted to pH 7 using a concentrated solution of caustic soda, 6 g active carbon are added, and it is stirred for 10 minutes at 50°C. After filtration in a Buchner funnel and washing with 20 ml of water at 50°C, the filtrate is cooled to 30°C and inoculated with 0.6 g of L-BDA/D-NAP salt.

It is stirred at 30°C for 3 hours, at 10°C for 2 hours, filtered in a Buchner funnel, washed with 100 ml of water at 10°C, and dried at 40°C. 101.8 g of L-BDA/D-NAP salt are obtained, i.e. 61.8% of theory; melting point: 152°–157°C; [α] $_D^{20}$+20.7° (2% methanol). If desired, the salt can be recrystallized from water.

b. In order to convert the L-BDA/D-NAP salt into L-BDA, 100 g of the L-BDA/D-NAP salt are dissolved at 50°C in 1.5 liters of water. While stirring, about 130 ml of 2N-hydrochloric acid are added over 30 minutes at 50°C, bringing the pH to 1. L-BDA precipitates. The mass is stirred for 30 minutes at 50°C, cooled with ice, stirred for 1 hour at 5° to 10°C, suction filtered, washed well with water and the precipitate is dried at about 70°C. 60.3 g of L-BDA are obtained, i.e. about 98.9 percent of theory: melting point 174°/176°178°C; [α] $_D^{20}$– 34.6° (2 percent methanol). By saponifying with hydrobromic acid, L-BDA is converted to L-DOPA in a yield of about 75 percent of theory ([a] $_D^{20}$– 12° (5 percent, 1N-hydrochloric acid)).

B. Production of D,L-N-benzoyl-3,4-dimethoxyphenylalanine (D,L-BDA) from the Mother Liquors of the Racemate Separation a. For the production of D-BDA the filtrate and the wash water from (Aa) and (Ab) are heated to 50°C and, while stirring, adjusted to pH 1.0 with 220 ml of 2N-hydrochloric acid. It is stirred for one-half hour at 50°C and for 1 hour at 5° to 10°C, suction filtered, washed six times with 100 ml of water each time and dried at about 70°C. 136 g of a mixture of D-BDA and D,L-BDA are obtained, i.e. 97.5 percent of theory; melting point: 166°–176°C; [α] $_D^{20}$ + 16.7° (2 percent methanol). The mother liquor obtained contains D-NAP, the recovery of which is described under C.

b. the racemization of the mixture of D-BDA and D,L-BDA is realized with acetic acid anhydride and sodium acetate in aqueous solution. 200 g of the mixture from (a) are dissolved in 2 liters of water, adding 280 ml of 2n caustic soda at 60°; the pH-value is 8.2 80 g of sodium acetate (having three molecules of water of crystallization) are added, it is cooled to 50°C and, while stirring, 400 ml of acetic acid anhydride are added. In this operation the temperature rises to 58°C. The solution is heated to 80°C and again stirred for 30 minutes at 80°C; the pH-value is now 3.8. First, a yellow oil is obtained. It is cooled to 50°C whereupon the yellow oil crystallizes. By adding 435 ml of 50 percent caustic soda solution the pH rises to 8.2 and a clear solution is obtained. 20 g of active carbon are added, the solution is stirred for 15 minutes at 50°C, suction filtered and washed with 200 ml of water. While stirring, 1.6 liters of concentrated hydrochloric acid are added to the filtrate at 50°C over 30 minutes until the pH-value is 1.0 whereupon a precipitate forms. The mass is stirred for one-half hour at 50°C, 1 hour at 5° to 10°C, suction filtered, the precipitate is washed four times with 400 ml of water each time and dried at 70°C. 183.4 g D,L-BDA are obtained, i.e. 91.7 percent of theory; melting point: 178°–182°C; [α] $_D^{20}$ + 0.2° (2 percent methanol). The D,L-BDA obtained in this manner is re-cycled for use in further racemate separation.

C. Recovery of D(-)-threo-1-m-nitrophenyl-2-aminopropane diol-1,3

In order to recover D-NAP, the filtrates obtained when separating D-BDA (Ba) and L-DOPA (Ab) are combined and adjusted to pH 9 with a solution of caustic soda. Benzaldehyde (10 percent excess) is added, the solution is stirred for 2 ½ hours and, by adding caustic soda solution, the pH is brought to 9. After suction filtration and drying the D-NAP-benzal is obtained in a yield of more than 95 percent of theory. The D-NAP-benzal is saponified with hydrochloric acid and, after separating the benzaldehyde, the D-NAP is precipitated in a yield of approximately 85 percent of theory by bringing the pH to 10.6 with caustic soda solution. By adding benzaldehyde at pH 9, the remainder of the D-NAP is precipitated as D-NAP-benzal, which is used again in the following saponification.

D,L-BDA can be prepared according to "Zeitschrift fuer physiologische Chemie," pages 233–239, 219 (1933).

It will be appreciated that the instant specification and examples are set forth by way of illustration and not limitation and that various modifications and changes may be made without departing from the spirit and scope of the present invention.

What is claimed is:

1. The process which comprises forming an aqueous solution of D,L-N-benzoyl-3,4-dimethoxy-phenyl-alanine, adding thereto at least one-half to 1 molar equivalent of one amine selected from the group consisting of D(-)-threo-1-m-nitrophenyl-2-amino-propanediol-1,3, D(-)-threo-1-p-nitrophenyl-2-amino-propanediol-1,3, and D(-)-threo-1-phenyl-2-amino-propandiol-1,3, such that the water to reactants ratio is from 2 to 20:1 expressed in ml:g at a temperature of from 50°C to 100°C, and reducing the temperature to selectively precipitate the corresponding amine salt of L-N-benzoyl-3,4-dimethoxy-phenyl-alanine, and separating said precipitated amine salt from the solution containing the D-N-benzoyl-3,4-dimethoxy-phenyl-alanine and some L-N-benzoyl-3,4-dimethoxy-phenyl-alanine.

2. Process according to claim 1, wherein there is also added to said solution up to about 0.5 mole of sodium hydroxide per mole of D,L-N-benzoyl-3,4-dimethoxy-phenylalanine, the total of amine plus sodium hydroxide being substantially about 1 mole per mole of D,L-N-benzoyl-3,4-dimethoxy-phenyl-alanine.

3. Process according to claim 1, wherein said amine is D(-)-threo-1-m-nitrophenyl-2-amino-propanediol-1,3.

4. The L-N-benzoyl-3,4-dimethoxy-phenyl-alanine salt of at least one amine selected from the group consisting of D-(-)-threo-1-m-nitrophenyl-2-amino-propanediol-1,3, D-(-)-threo-1-p-nitrophenyl-2-amino-propanediol-1,3, and D(-)-threo-1-phenyl-2-amino-propanediol-1,3.

5. A salt according to claim 4, wherein said amine is D(-)-threo-1-m-nitrophenyl-2-amino-propanediol-1,3.

* * * * *